US012811996B2

(12) United States Patent
Horowitz et al.

(10) Patent No.: US 12,811,996 B2
(45) Date of Patent: *Nov. 24, 2026

(54) QP RANGE SPECIFICATION FOR EXTERNAL VIDEO RATE CONTROL

(71) Applicant: Google LLC, Mountain View, CA (US)

(72) Inventors: Michael Horowitz, Austin, TX (US); Wonkap Jang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 18/636,769

(22) Filed: Apr. 16, 2024

(65) Prior Publication Data

US 2024/0259455 A1 Aug. 1, 2024

Related U.S. Application Data

(63) Continuation of application No. 17/450,241, filed on Oct. 7, 2021, now Pat. No. 11,979,449.

(51) Int. Cl.
*H04L 65/70* (2022.01)
*H04N 19/124* (2014.01)

(52) U.S. Cl.
CPC ........... *H04L 65/70* (2022.05); *H04N 19/124* (2014.11)

(58) Field of Classification Search
CPC ...... H04L 65/70; H04N 19/124; H04N 19/15; H04N 19/154; H04N 19/169;
(Continued)

(56) References Cited

U.S. PATENT DOCUMENTS 6,256,423 B1 7/2001 Krishnamurthy et al.
2007/0204067 A1* 8/2007 Walker ................ H04N 19/154 375/E7.162

(Continued)

FOREIGN PATENT DOCUMENTS

CN 1372769 A * 10/2002 ............ H04N 19/51
EP 0469648 A2 2/1992
EP 3087744 B1 * 12/2020 .......... H04N 19/119

OTHER PUBLICATIONS

International Search Report and Written Opinion for the related Application No. PCT/US2022/077571, dated Jan. 20, 2023, 46 pages.

(Continued)

*Primary Examiner* — Duc Nguyen
(74) *Attorney, Agent, or Firm* — Honigman LLP; Brett A. Krueger

(57) ABSTRACT

Operations of a method include obtaining a segment of image data that represents a portion of a frame of video image data to be encoded. The operations include determining, based on the segment and a target bitrate, a quantization parameter (QP) value for the segment. The operations include determining a minimum QP value and a maximum QP value that establishes a range of QP values an integrated bit rate control algorithm may use to encode the segment. The operations include encoding the segment with a first QP value that is greater than the minimum QP value and less than the maximum QP value. The operations include adjusting, by the bit rate control algorithm, the first QP value to a second QP value that is greater than the minimum QP value and less than the maximum QP value. The operations include transmitting the encoded segment to a remote device.

20 Claims, 6 Drawing Sheets

(58) Field of Classification Search
CPC .... H04N 19/192; H04N 19/197; H04S 3/008; H04S 7/30; H04R 3/001; H04R 5/021; H04R 2420/07
See application file for complete search history.

(56) References Cited

U.S. PATENT DOCUMENTS

| | | | | |
|---|---|---|---|---|
| 2007/0237220 | A1 | 10/2007 | Kuo | |
| 2010/0232498 | A1 | 9/2010 | Liu et al. | |
| 2015/0085922 | A1* | 3/2015 | Hebel | H04N 19/124 375/240.03 |
| 2016/0065930 | A1* | 3/2016 | Chandra | H04N 13/167 348/46 |
| 2016/0219248 | A1 | 7/2016 | Reznik et al. | |
| 2017/0104804 | A1 | 4/2017 | Do et al. | |
| 2019/0261007 | A1 | 8/2019 | Emmanuel et al. | |
| 2023/0110569 | A1* | 4/2023 | Horowitz | H04N 19/169 348/14.13 |

OTHER PUBLICATIONS

Cellario L et al: “Celp Coding at Variable Rate”, European Transactions on Telecommunications and Related Technologies, AEI, Milano, IT, vol. 5, No. 5, Sep. 1, 1994 (Sep. 1, 1994), pp. 69-79, XP000470681, ISSN: 1120-3862, 11 pages.

* cited by examiner

QP RANGE SPECIFICATION FOR EXTERNAL VIDEO RATE CONTROL

CROSS REFERENCE TO RELATED APPLICATIONS

This U.S. patent application is a continuation of, and claims priority under 35 U.S.C. § 120 from, U.S. patent application Ser. No. 17/450,241, filed on Oct. 7, 2021. The disclosure of this prior application is considered part of the disclosure of this application and is hereby incorporated by reference in its entirety.

TECHNICAL FIELD

This disclosure relates to quantization parameter range specification for external video rate control.

BACKGROUND

When encoding video, such as when transmitting video from one device to another device for real-time video communications, generally a target bit rate is specified. An encoder, when encoding each frame or sub-frame (e.g., segment), attempts to achieve the target bit rate. Often, a bit rate control algorithm executed by, for example, an external bit rate control module, adjusts a quantization parameter (QP) value that the encoder uses when attempting to achieve the target bit rate. The external bit rate control module may send the encoder a QP value on a frame-by-frame basis. The encoder then uses the same QP value when encoding the entirety of the frame. After encoding the frame, the encoder communicates the actual bitrate of the frame to the external bit rate control module which uses this information to adjust the QP value for the next frame.

SUMMARY

One aspect of the disclosure provides a method of providing a quantization parameter (QP) range specification for external video rate control. The method, when executed by data processing hardware of a user device, causes the data processing hardware to perform operations. The operations include obtaining a segment of data. The segment of data represents a portion of image data or audio data to be encoded by the data processing hardware. The operations include determining, based on the segment of data and a target bitrate, a QP value for the segment of data. The determined QP value is representative of an amount of compression achieved during encoding. The operations also include determining, using the determined QP value, a minimum QP value and a maximum QP value. The minimum QP value and the maximum QP value establish a range of QP values an encoder's integrated bit rate control algorithm may use to encode the segment of data. The operations include encoding, using the integrated bit rate control algorithm, the segment of data with a first QP value that is greater than or equal to the minimum QP value and less than the maximum QP value. While encoding the segment of data using the first QP value, the operations include adjusting, by the integrated bit rate control algorithm, the first QP value to a second QP value. The second QP value is greater or equal to than the minimum QP value and less than or equal to the maximum QP value. The second QP value may be different than the first QP value. The operations also include transmitting the encoded segment of data to a remote device.

Implementations of the disclosure may include one or more of the following optional features. In some implementations, the bit rate control algorithm is executed by a hardware encoder. Optionally, the portion of data includes real-time video communication between the user device and the remote device. In some examples, determining the minimum QP value and the maximum QP value includes determining a scaling factor and scaling the QP value using the scaling factor. In some implementations, the scaling factor is based on a quality of the encoder's integrated bit rate control algorithm (e.g., an ability of the integrated bit rate control algorithm to achieve and maintain a specified target bit rate). An increase in the quality of the integrated bit rate control algorithm may correspond to an increase in the scaling factor. In some examples, the scaling factor is based on content of the frame of data to be encoded.

In some implementations, determining the minimum QP value and the maximum QP value includes determining a minimum factor value and a maximum factor value, adjusting the maximum QP value relative to the QP value using the maximum factor value, and adjusting the minimum QP value relative to the QP value using the minimum factor value.

Optionally, the operations further include after encoding the segment of data, obtaining an actual bitrate of the encoded segment of data and obtaining a second segment of data. The second segment of data represents a different portion of data to be encoded by the data processing hardware. The operations may also further include determining a second QP value for the second segment of data based on the second segment of data, the target bitrate, and the actual bitrate of the encoded segment of data (i.e., the previously encoded segment). The different portion of data represented by the second segment of the data may belong to a same frame of the data as the portion of data represented by the encoded segment of data. Alternatively, the different portion of data represented by the second segment of data may belong to a different frame of the video data than the portion of data represented by the encoded segment of data. In some examples, the operations include determining a minimum delta QP value and a maximum delta QP value establishing a limit on a rate of change of QP values the integrated bit rate control algorithm may use to encode the segment of data.

Another aspect of the disclosure provides a system for providing a QP range specification for external video rate control. The system includes data processing hardware of a user device and memory hardware in communication with the data processing hardware. The memory hardware stores instructions that when executed on the data processing hardware cause the data processing hardware to perform operations. The operations include obtaining a segment of data. The segment of data represents a portion of image data or audio data to be encoded by the data processing hardware. The operations include determining, based on the segment of data and a target bitrate, a QP value for the segment of data. The determined QP value is representative of an amount of compression achieved during encoding. The operations also include determining, using the determined QP value, a minimum QP value and a maximum QP value. The minimum QP value and the maximum QP value establish a range of QP values an encoder's integrated bit rate control algorithm may use to encode the segment of data. The operations include encoding, using the integrated bit rate control algorithm, the segment of data with a first QP value that is greater than the minimum QP value and less than the maximum QP value. While encoding the segment of data using the first QP value, the operations include adjusting, by the integrated bit rate control algorithm, the first QP value to a second QP value. The second QP value is greater than the minimum QP value and less than the maximum QP value. The second QP value is different than the first QP value. The operations also include transmitting the encoded segment of data to a remote device.

This aspect may include one or more of the following optional features. In some implementations, the integrated bit rate control algorithm is executed by a hardware encoder. Optionally, the portion of data includes real-time video communication between the user device and the remote device. In some examples, determining the minimum QP value and the maximum QP value includes determining a scaling factor and scaling the QP value using the scaling factor. In some implementations, the scaling factor is based on a quality of the encoder's integrated bit rate control algorithm (e.g., the ability of the integrated bit rate control to achieve and maintain a specified target bit rate). An increase in the quality of the integrated bit rate control algorithm may correspond to an increase in the scaling factor. In some examples, the scaling factor is based on content of the frame of data to be encoded.

In some implementations, determining the minimum QP value and the maximum QP value includes determining a minimum factor value and a maximum factor value, adjusting the maximum QP value relative to the QP value using the maximum factor value, and adjusting the minimum QP value relative to the QP value using the minimum factor value.

Optionally, the operations further include after encoding the segment of data, obtaining an actual bitrate of the encoded segment of data and obtaining a second segment of data. The second segment of data represents a different portion of data to be encoded by the data processing hardware. The operations may also further include determining a second QP value for the second segment of data based on the second segment of data, the target bitrate, and the actual bitrate of the previously encoded segment of data. The different portion of data represented by the second segment of the data may belong to a same frame of the data as the portion of data represented by the encoded segment of data. Alternatively, the different portion of data represented by the second segment of data belongs to a different frame of the data than the portion of data represented by the encoded segment of data. In some examples, the operations include determining a minimum delta QP value and a maximum delta QP value establishing a limit on a rate of change of QP values the integrated bit rate control algorithm may use to encode the segment of data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
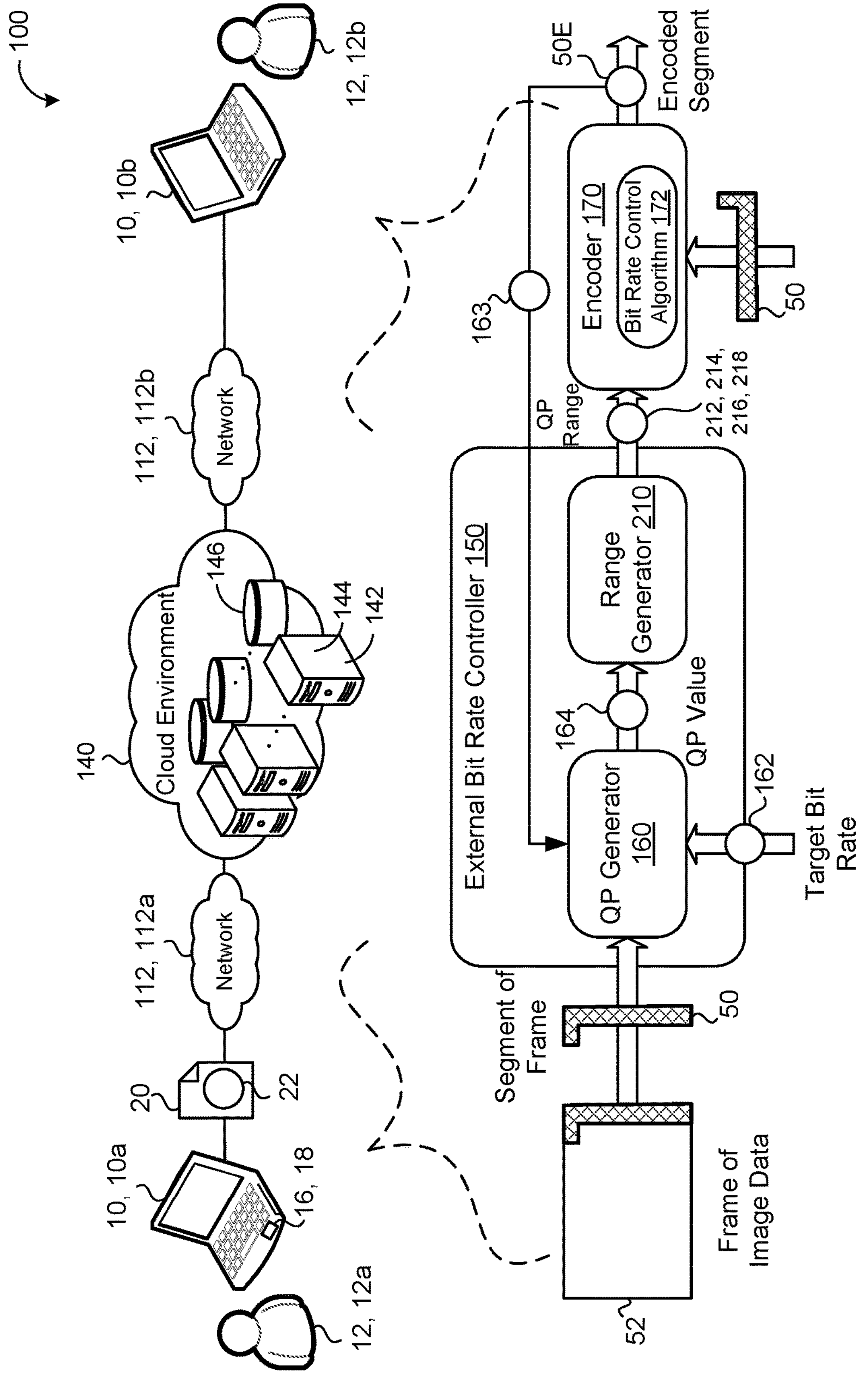
FIG. 1 is a schematic view of an example system for providing a quantization parameter (QP) value for external video rate control.

In real-time communications (e.g., audio or video), data captured by a user device (e.g., audio data and/or video data) must be quickly encoded prior to transmission to another user device. In order to maintain quality service given bandwidth and other constraints, encoders encoding the data generally attempt to consistently achieve a target bit rate. The bit rate represents the number of bits that are transmitted between the user devices per unit of time. A bit rate control algorithm typically adjusts a quantization parameter (QP) value that the encoder uses to attempt to achieve the target bit rate. The QP value regulates how much compression is achieved during the encoding process. The lower the amount of compression, the higher the quality of the encoding and the higher the bit rate to transmit the data.

In some scenarios, the encoder has a poor-quality integrated bit rate control algorithm that is consistently suboptimal (e.g., the algorithm regularly produces a QP value that results in an encoded bit rate that substantially exceeds the target bit rate). In these scenarios, an external bit rate control algorithm may instead provide the QP value to the encoder with the aim of achieving a more accurate bit rate than the integrated bit control algorithm can provide. The QP value generated by the external bit rate control algorithm is typically provided to the encoder on a frame-by-frame basis. That is, for each frame, the external module provides the encoder with a single QP value that the encoder uses for the entire frame. After the encoder encodes the frame of data using the provided QP value, the encoder provides the external module with the actual bit rate of the encoded frame and the external module determines the QP value for the next frame.

In some situations, it may be advantageous to encode portions of a frame of image data (or, for example, audio data) with higher quality than other portions (i.e., using a lower QP value). To compensate for the additional bits generated to support the higher quality portion, other portions of the frame may be encoded with lower quality (i.e., using a higher QP value). In other examples, different portions of a video frame require different QP values in order to achieve high video quality without significantly overshooting or undershooting the target bit rate. However, modulating the QP value when using an external module for the bit rate control algorithm typically introduces significant inter-process communication overhead between the external module and the encoder. The more frequently the QP value is updated (e.g., several times per frame), the more significant this overhead. Such overhead can lead to resource contention issues and processing delays, the latter of which is especially egregious for real-time communication systems.

Implementations herein are directed toward an external bit rate controller that provides external bit rate control for an encoder. The bit rate controller receives a frame of image data or a segment of image data (i.e., a portion of a frame of image data) and determines, based on the segment, a quantization parameter (QP) value for the segment. Optionally, the bit rate controller uses an actual number of bits used to encode the previous segment. The bit rate controller, using the determined QP value, determines a maximum QP value and a minimum QP value. The minimum QP value and the maximum QP value establish a range of QP values an encoder may use when encoding the segment of image data. The bit rate controller sends the minimum QP value and the maximum QP value to the encoder, which encodes the segment of image data with an adjustable QP value that is bounded by the minimum QP value and the maximum QP value.

Referring to FIG. 1, in some implementations, an example system 100 includes two or more user devices 10, 10*a-n*, each associated with a respective user 12, 12*a-n*. The user devices 10 are in communication with each other via, for example, a remote system 140 and one or more networks 112, 112*a-n*. The user devices 10 may correspond to any computing device, such as a desktop workstation, a laptop workstation, or a mobile device (e.g., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic computing resources 144 (e.g., data processing hardware) and/or storage resources 142 (e.g., memory hardware). A data store 146 (i.e., a remote storage device 146) may be overlain on the storage resources 142 to allow scalable use of the storage resources 142 by one or more of the client or computing resources 144. The remote system 140 is configured to receive and transmit a video and/or voice data signal, such as that associated with a Voice over Internet Protocol (VoIP) call or a video chat application, between user devices 10, 10*a-b* through the networks 112, 112*a-b*. Therefore, a first caller 12*a* using a first user device 10*a* may place a phone call or video call (e.g., send a communication request) to a second user device 10*b* through remote system 140. The user devices 10, 10*a-b* communicate, for example, by sending a digital communication data signal through the network 112, 112*a-b* to the remote system 140. In other examples, the user devices 10 communicate with each other directly (i.e., without the remote system 140). The communication data signal is split into a series of packets 20, via, for example, the TCP/IP or UDP protocol, with each packet 20 including representations of one or more audio/video samples or frames 22 of the communication signal from the respective user device 10.

One or both user devices 10 execute an external bit rate controller 150. The external bit rate controller 150 receives data captured by a sensor (e.g., a camera and/or a microphone) that is to be transmitted to the other user device 10 (e.g., for real-time communications). Examples herein discuss video communications, but the description equally applies to audio only communications. Here, the external bit rate controller 150 obtains a segment of image data 50 (or other data, such as audio data). In some examples, the segment of image data 50 may be a portion of a frame of image data 52 (e.g., captured by a camera of the user device 10), while in other examples, the segment of image data 50 may represent the entire frame of image data 52.

The external bit rate controller 150 includes a QP generator 160. The QP generator 160 receives the segment of image data 50 and a target bit rate 162. As discussed in more detail below, the QP generator 160 may also receive the actual bit rate of one or more previously encoded segments. The target bit rate 162 is the bit rate that is desirable for encoded communications to be transmitted at for communications with the other user device 10. The target bit rate 162 may be based on a number of factors, such as available bandwidth, type of communication, device resources, etc. The QP generator 160, based on the target bit rate 162 and the segment of image data 50 (and/or the actual bit rate of previously encoded segments), generates or determines a QP value 164. The QP value 164 represents an amount of compression achieved when the segment of image data 50 is encoded. Generally, the lower the QP value 164, the higher the quality of the encoding (i.e., the lower the amount of compression) and the higher the bit rate. Conversely, the higher the QP value 164, the lower the quality of the encoding (i.e., the higher the amount of compression) and the lower the bit rate. The generated QP value 164 represents the QP generator's estimate of the QP value that, when used to encode the segment of image data 50, will achieve the target bit rate 162.

The QP generator 160 provides the QP value 164 to a range generator 210. The range generator 210, as discussed in more detail below, generates or determines, using the QP value 164, a minimum QP value 212 and a maximum QP value 214. The minimum QP value 212 and the maximum QP value 214 establish a range of possible QP values an encoder 170 may use when encoding the segment of image data 50. The range generator 210 provides the range of QP values (i.e., the minimum QP value 212 and the maximum QP value 214) to the encoder 170. The encoder 170, in some implementations, includes a integrated bit rate control algorithm 172. The encoder, using the integrated bit rate control algorithm 172, encodes the segment of image data 50. The integrated bit rate control algorithm 172 is free to adjust the QP value within the range of QP values established by the minimum QP value 212 and the maximum QP value 214 when encoding the segment of image data 50. For example, the integrated bit rate control algorithm 172 begins encoding using a first QP value that is within the range established by the minimum QP value 212 and the maximum QP value 214. While encoding the segment of image data 50 using the first QP value, the integrated bit rate control algorithm 172 adjusts the first QP value to a second QP value that is still within the range of allowable QP values, but is different than the first QP value. That is, the integrated bit rate control algorithm 172 is free to adjust the QP value used to encode the segment of image data 50 as frequently as the integrated bit rate control algorithm 172 deems appropriate. The integrated bit rate control algorithm 172 is merely bound to keep the QP value used within the range established by the minimum QP value 212 and the maximum QP value 214.

In some examples, the range generator 210 also provides the generated QP value 164 to the encoder 170. In examples where the integrated bit rate control algorithm 172 does not or cannot accept ranges, the integrated bit rate control algorithm 172 may instead use the determined QP value 164 in lieu of the range established by the minimum QP value 212 and the maximum QP value 214. In these examples, the integrated bit rate control algorithm 172 will use the determined QP value 164 for the entirety of the segment of image data 50. For example, the encoder 170 may be a legacy encoder that lacks the capability of accepting or interpreting the range of QP values. In this instance, the external bit rate controller 150 and the encoder 170 may "fall back" on using the determined QP value 164 to encode the segment of image data 50.

The encoder 170 may be a software encoder or a hardware encoder separate (i.e., external) from the external bit rate controller 150. The external bit rate controller 150 and encoder 170 communicate over a communication channel established between the modules 150, 170. By providing a range of possible QP values to the encoder 170, the external bit rate controller 150 enables the encoder 170 the capability of frequently adjusting the QP value used to encode the segment of image data 50 to maximize quality while maintaining the target bit rate without incurring excessive overhead in communications between the modules 150, 170. The encoder 170, after encoding the segment of image data 50, transmits an encoded segment of image data 50E to the other user device 10 (or any other remote device) in real-time communication with the user device 10 executing the external bit rate controller 150. The user device 10 may immediately transmit the encoded segment of image data 50E to the other user device 10. Alternatively, when the encoded segment of image data 50E is less than the entirety of the frame of image data 52, the user device 10 may wait until the entire frame of image data 52 is encoded and transmits the entire encoded frame of image data 52.

Figure 2:
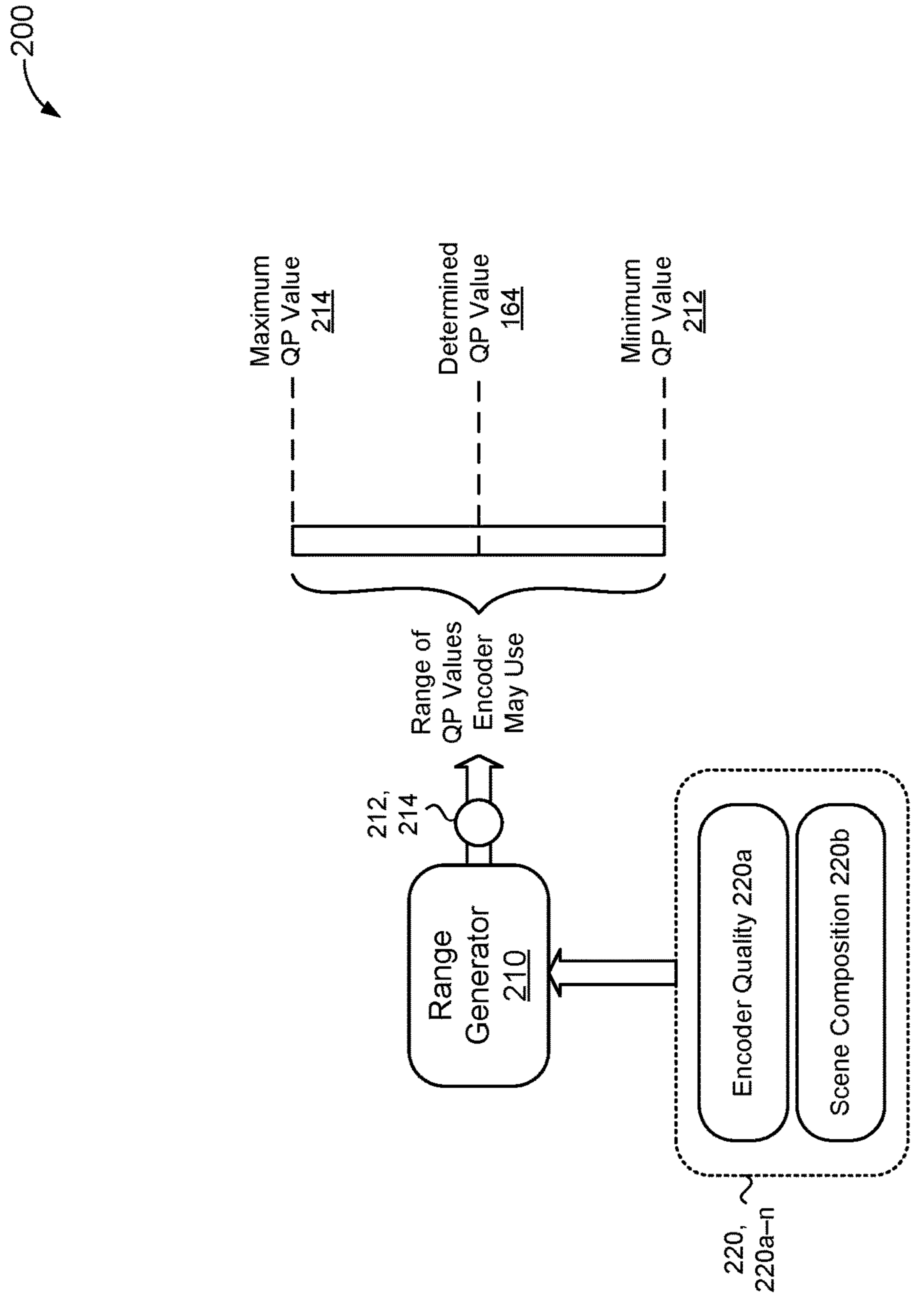
FIG. 2 is a schematic view of exemplary components of the system of FIG. 1.

Referring now to FIG. 2, in some implementations, and as illustrated by schematic view 200, the range generator 210 determines the minimum QP value 212 and the maximum QP value 214 based on one or more parameters 220, 220*a-n*. In some examples, the parameters 220 include an encoder bit rate accuracy parameter 220*a*. The encoder bit rate accuracy parameter 220*a* quantifies, to some extent, an accuracy of the integrated bit rate control algorithm 172 of the encoder 170. For example, a integrated bit rate control algorithm 172 that is known to generally encode data at or near the target bit rate may have a high accuracy while an integrated bit rate control algorithm 172 that is known to generally encode data that fails to be at or near the target bit rate may have a low accuracy.

In some implementations, the parameters 220 include a scene composition parameter 220*b*. The scene composition parameter 220*b* quantifies, to some extent, the composition of one or more frames of image data 52. In some examples, the composition is merely dependent upon the current frame 52 or segment 50 being encoded, while in other implementations, previously encoded frames 52 and/or segments 50 are also included. The scene composition parameter 220*b* may account for activity within the frame of image data 52. A scene with a high amount of activity may benefit from a different range (e.g., a greater range) than a scene with a relatively lower amount of activity. The greater range may allow the encoder 170 more flexibility in dealing with the activity of the scene.

The range generator 210, using the parameters 220 and the determined QP value 164 (from the QP generator 160), generates the minimum QP value 212 and the maximum QP value 214. The minimum QP value 212 is equal to or less than the determined QP value 164 while the maximum QP value 214 is greater than or equal to the determined QP value 164. In some examples, the range of QP values may be limited to the determined QP value 164 when the range generator 210 sets the minimum QP value 212 and the maximum QP value 214 both to the value of the determined QP value 164.

Referring back to FIG. 1, in some examples, the range generator 210 generates a minimum delta QP value 216 and/or a maximum delta QP value 218. The delta QP values may restrict an amount of QP change allowed per block or other portion of a segment 50 or frame 52. For example, when the integrated bit rate controller 172 encodes a block of a segment 50 using a first QP value, the maximum delta QP value 218 limits how much larger the next QP value can be for the next block in the segment 50, while the minimum delta QP value 216 limits how much smaller the next QP value can be for the next block in the segment 50. That is, the delta QP values 216, 218 may limit a rate of change of the QP value as the integrated bit rate controller 172 encodes a segment 50 or frame 52. These delta QP values 216, 218 may be the same or different than the maximum QP value 213 and minimum QP value 212 and may serve to ensure that the integrated bit rate controller 172 does not negatively impact encoding quality with large changes in QP values during encoding.

Figure 3A:
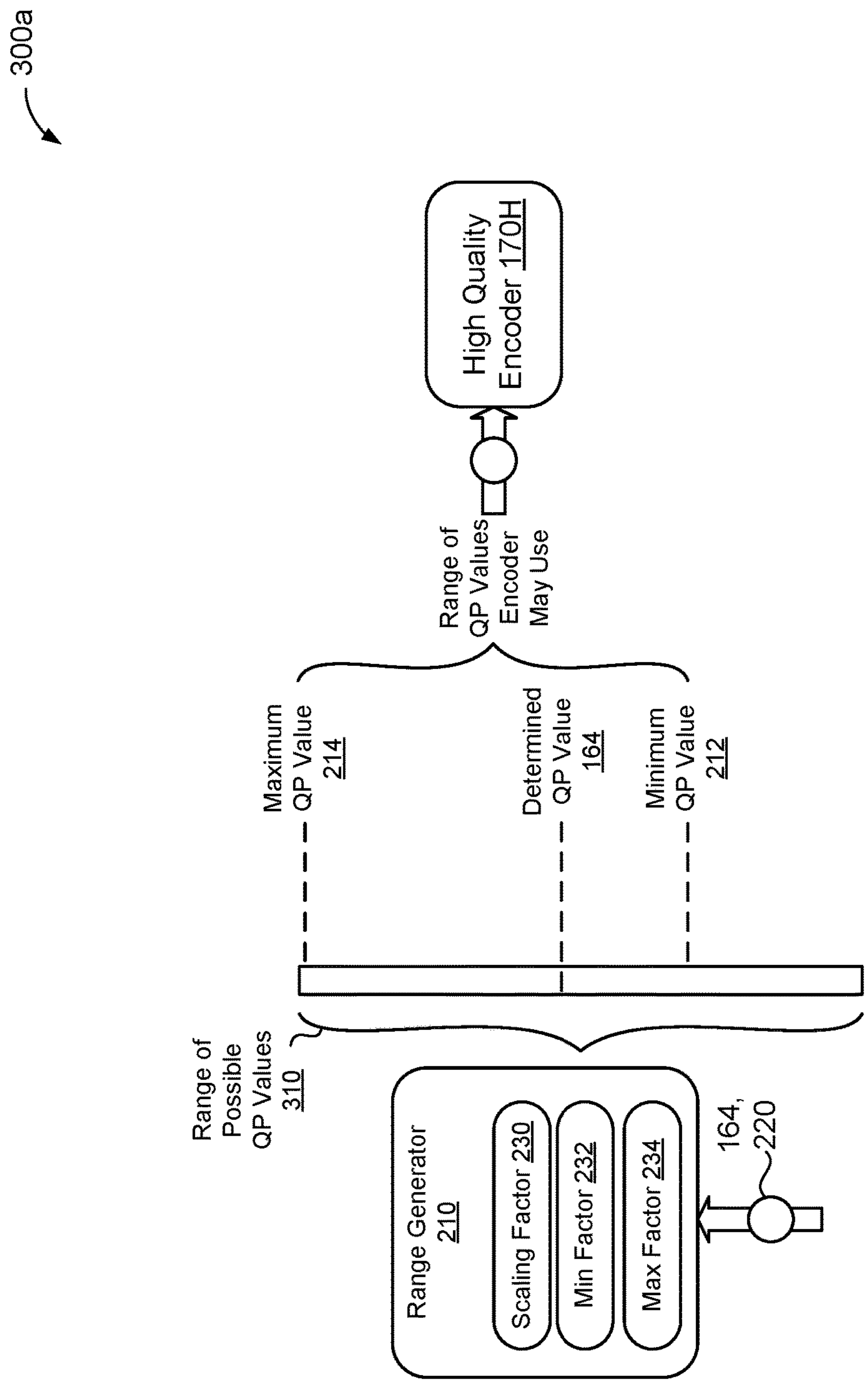
FIGS. 3A and 3B are schematic views of exemplary QP ranges for different encoders.
Figure 3B:
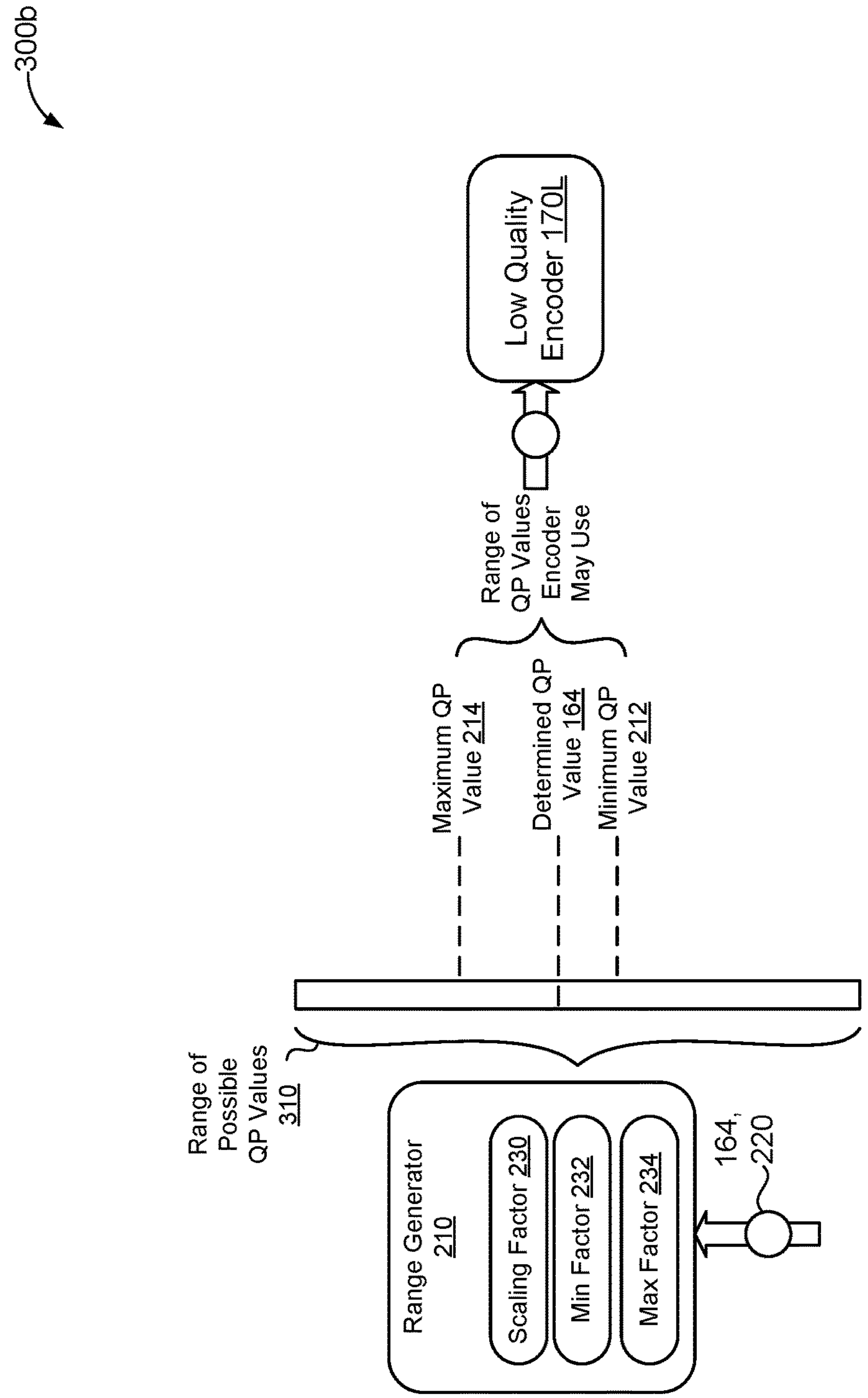

Referring now to FIGS. 3A and 3B, in some examples, the range generator 210 determines the minimum QP value 212 and the maximum QP value 214 by determining a scaling factor 230 and scaling the determined QP value 164 using the scaling factor 230. Additionally or alternatively, the range generator 210 determines the minimum QP value 212 and the maximum QP value 214 using a minimum factor 232 and/or a maximum factor 234. For example, the range generator uses Equation (1) to determine the minimum QP value 212:

$$\text{minimum } QP = \max(\text{floor}(QP(i) - a * QP(i) * x), 0) \tag{1}$$

Here, QP(i) is the determined QP value 164 for the current frame 52 (i.e., the ith frame) or segment 50, a is the scaling factor 230, and x is the minimum factor 232. Similarly, the range generator 210 may generator the maximum QP value 214 using Equation (2):

$$\text{maximum } QP = \min(\text{ceiling}(QP(i) + a * QP(i) * y), \text{MAX}_{QP}) \tag{2}$$

Here, y is the maximum factor 234 and $\text{MAX}_{QP}$ refers to the maximum QP value supported by the encoder 170. In some implementations, the scaling factor 230 (i.e., a) is not a constant in Equations (1) and (2), but instead the scaling factor 230 is defined by a non-liner function or as a linear-per-segment variable instead. That is, in some examples, the scaling factor 230 is variable based on a function of the activity level in the segment 50. For example, the greater the activity, the faster the scaling factor 230 scales.

For both Equation (1) and Equation (2), the scaling factor 230 (*a*), for example, has a value between 0.0 and 2.0 (inclusive) while the minimum factor 232 (*x*) and the maximum factor 234 (*y*), for example, have values between 0.0 and 0.5 (inclusive). The range generator 210 may generate the value of the scaling factor 230 based on the parameters 220. For example, when the encoder 170 is known to have a high accuracy integrated bit rate control algorithm 172, the range generator 210 may use a larger scaling factor 230 (i.e., the range generator 210 increases the scaling factor 230) than when the encoder 170 is known to have a low accuracy integrated bit rate control algorithm 172. In the example shown, the larger the value of the scaling factor 230, the larger the range of values between the minimum QP value 212 and the maximum QP value 214. That is, the larger the scaling factor 230, the greater the difference between the minimum QP value 212 and the maximum QP value 214.

The scaling factor 230 may change on a frame-by-frame or segment-by-segment basis based on other parameters 220 (e.g., based on the content of the frame 52 using the scene composition parameter 220*b*). For example, when the frame 52 includes a busy street scene, the scaling factor 230 may be larger than when the frame 52 includes a person talking with a static background. That is, frames 52 or segments 50 with more activity (i.e., changes from frame-to-frame or segment-to-segment) may have a larger scaling factor 230.

The minimum factor 232 and the maximum factor 234 may control the offset of the minimum QP value 212 and the maximum QP value 214 from the determined QP value 164 respectively. That is, the minimum factor 232 may control how much smaller the minimum QP value 212 is compared with the determined QP value 164 while the maximum factor 234 may control how much larger the maximum QP value 214 is compared to the determined QP value 164. The minimum factor 232 may be typically smaller than the maximum factor 234 because a QP value that is too low may be more harmful or disruptive to the real-time communications than a QP value that is too high. This is because a QP value that is too high may lead to temporary degradation in quality of the image while a QP value that is low may lead to temporary loss in communication entirely. As such, a nominal value for the minimum factor 232 may be 0.1 while a nominal value for the maximum factor 234 may be 0.25.

Thus, in some implementations, the range generator 210 determines the minimum QP value 212 at least in part by determining the minimum factor 232 and adjusting the minimum QP value 212 relative to the QP value 164 using the minimum factor 232. Likewise, the range generator 210 may determine the maximum QP value 214 at least in part by determining the maximum factor 234 and adjusting the maximum QP value 214 relative to the QP value 164 using the maximum factor 234.

As an example of the scaling factor 230, minimum factor 232, and maximum factor 234, schematic view 300*a* of FIG. 3A includes the range generator 210 providing the minimum QP value 212 and the maximum QP value 214 to a high accuracy encoder 170H. Because of the high accuracy of the encoder 170H, the range of values established by the minimum QP value 212 and the maximum QP value 214 cover a significant portion of a range of possible QP values 310. The range of possible QP values 310 represents all of the QP values the encoder 170H supports. Notably, the offset between the minimum QP value 212 and the QP value 164 is smaller than the offset between the maximum QP value 214 and the QP value 164 (based on the minimum factor 232 and the maximum factor 234) in order to hedge against bit rate spikes that exceed available bandwidth between the user devices 10.

As another example, schematic view 300*b* of FIG. 3B includes the range generator 210 providing the minimum QP value 212 and the maximum QP value 214 to a low accuracy encoder 170L. Because of the low accuracy of the encoder 170L, the range of values established by the minimum QP value 212 and the maximum QP value 214 cover much less of the range of possible QP values 310 compared to the range provided the high-accuracy encoder 170H (FIG. 3A). That is, the range generator 210 reflects the lack of "trust" in the low-accuracy encoder's capabilities by restricting the range the low accuracy encoder 170L is allowed to use when encoding the frame 52 or segment 50.

Referring back to FIG. 1, in some implementations, after the encoder 170 has encoded the segment of image data 50, the external bit rate controller 150 obtains the actual bit rate 163 achieved from encoding the segment of image data 50. For example, the encoder 170 provides the actual bit rate 163 to the external bit rate controller 150. The external bit rate controller 150, after receiving a second segment of image data 50 that represent a different portion of the image data (e.g., a different portion of the same frame 52 as the previous segment 50 or a different frame 52 all together) to be encoded, determines the QP value 164 for the second segment of image data 50 using, at least in part, the actual bit rate 163 from the previous segment 50. The external bit rate controller 150 may store the actual bit rates 163 for any number of segments 50 and/or frames 52 to help determine the most appropriate QP values 164 for subsequent segments 50 and/or frames 52.

Thus the external bit rate controller 150 allows an external encoder to change or modulate the QP value several times during the same frame or segment of image data without requiring extensive communications overhead between the bit rate controller and the encoder. That is, instead of communicating each QP value change to the encoder, the bit rate controller provides a range of allowable QP values to the encoder, and the encoder makes use of an integrated bit rate control algorithm to adjust the QP value dynamically while remaining with the range established by the external bit rate controller, thus avoiding high inter-process communication overhead between the bit rate controller and the encoder. While examples herein describe the bit rate controller providing the encoder a minimum QP value and a maximum QP value to establish the range of QP values, other techniques may be used instead. For example, the bit rate controller may provide the determined QP value and one or more offsets to establish the range of QP values.

Figure 4:
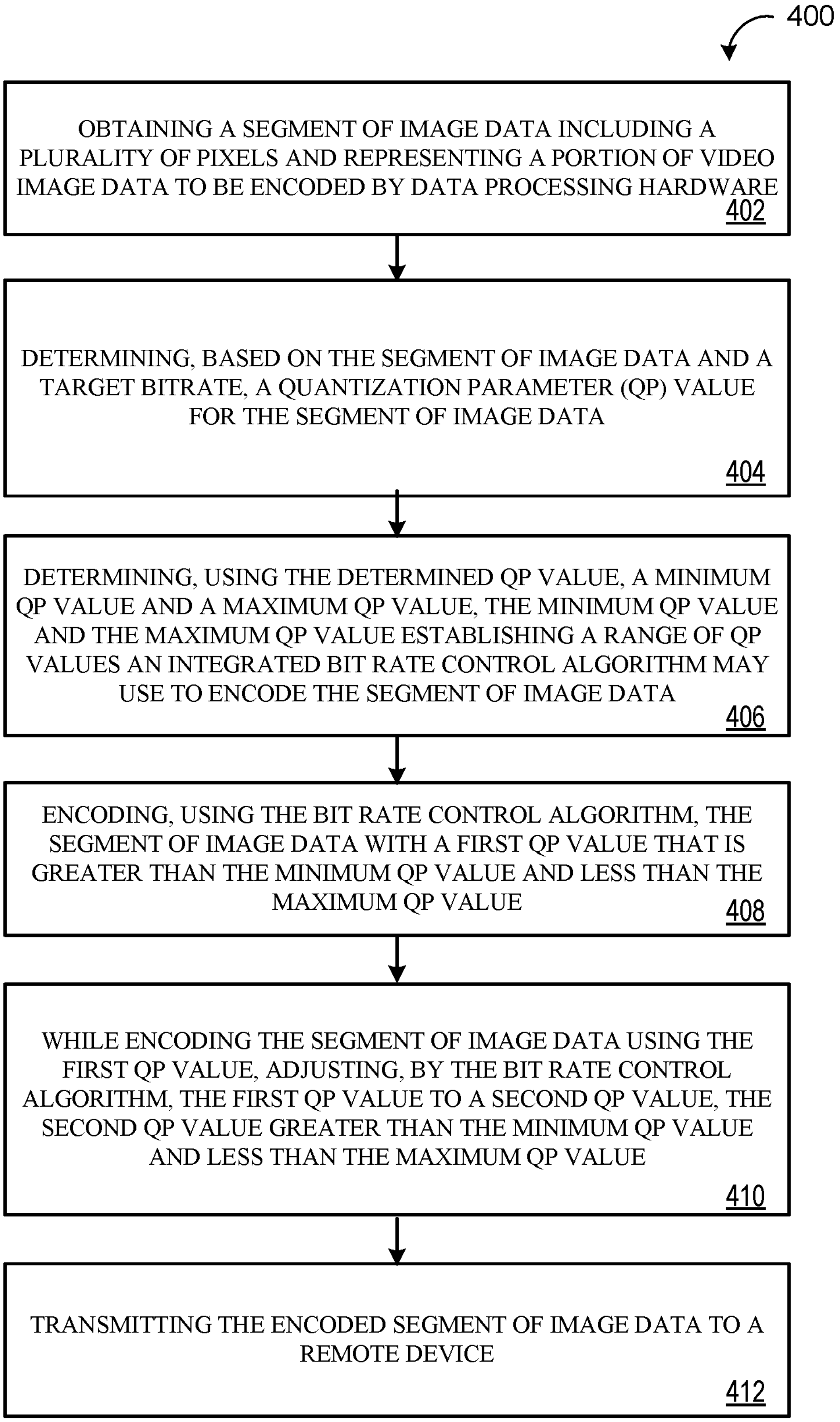
FIG. 4 is a flowchart of an example arrangement of operations for a method of providing a QP value for external video rate control.

FIG. 4 is a flowchart of an exemplary arrangement of operations for a computer-implemented method 400 that, when executed by data processing hardware 16 causes the data processing hardware 16 to perform the operations for providing QP range specification for external video rate control. The operations, at step 402, include obtaining a segment of image data 50 that includes a plurality of pixels. The segment of image data 50 represents at least a portion of a frame of video image data 52 to be encoded by the data processing hardware 16. At operation 404, the method 400 includes determining, based on the segment of image data 50 and a target bit rate 162, a quantization parameter (QP) value 164 for the segment of image data 50. The determined QP value 164 represents of an amount of compression achieved during encoding.

At operation 406, the method 400 includes determining, using the determined QP value 164, a minimum QP value 212 and a maximum QP value 214. The minimum QP value 212 and the maximum QP value 214 establish a range of QP values that an integrated bit rate control algorithm 172 may use to encode the segment of image data 50. The method 400, at operation 408, includes encoding, using the integrated bit rate control algorithm 172, the segment of image data 50 with a first QP value that is greater than the minimum QP value 212 and less than the maximum QP value 214. At operation 410, the method 400 includes, while encoding the segment of image data 50 using the first QP value, adjusting, by the integrated bit rate control algorithm 172, the first QP value to a second QP value that is greater than the minimum QP value 212 and less than the maximum QP value 214. The second QP value is different than the first QP value. At operation 412, the method 400 includes transmitting the encoded segment of image data 52E to a remote device 10.

Figure 5:
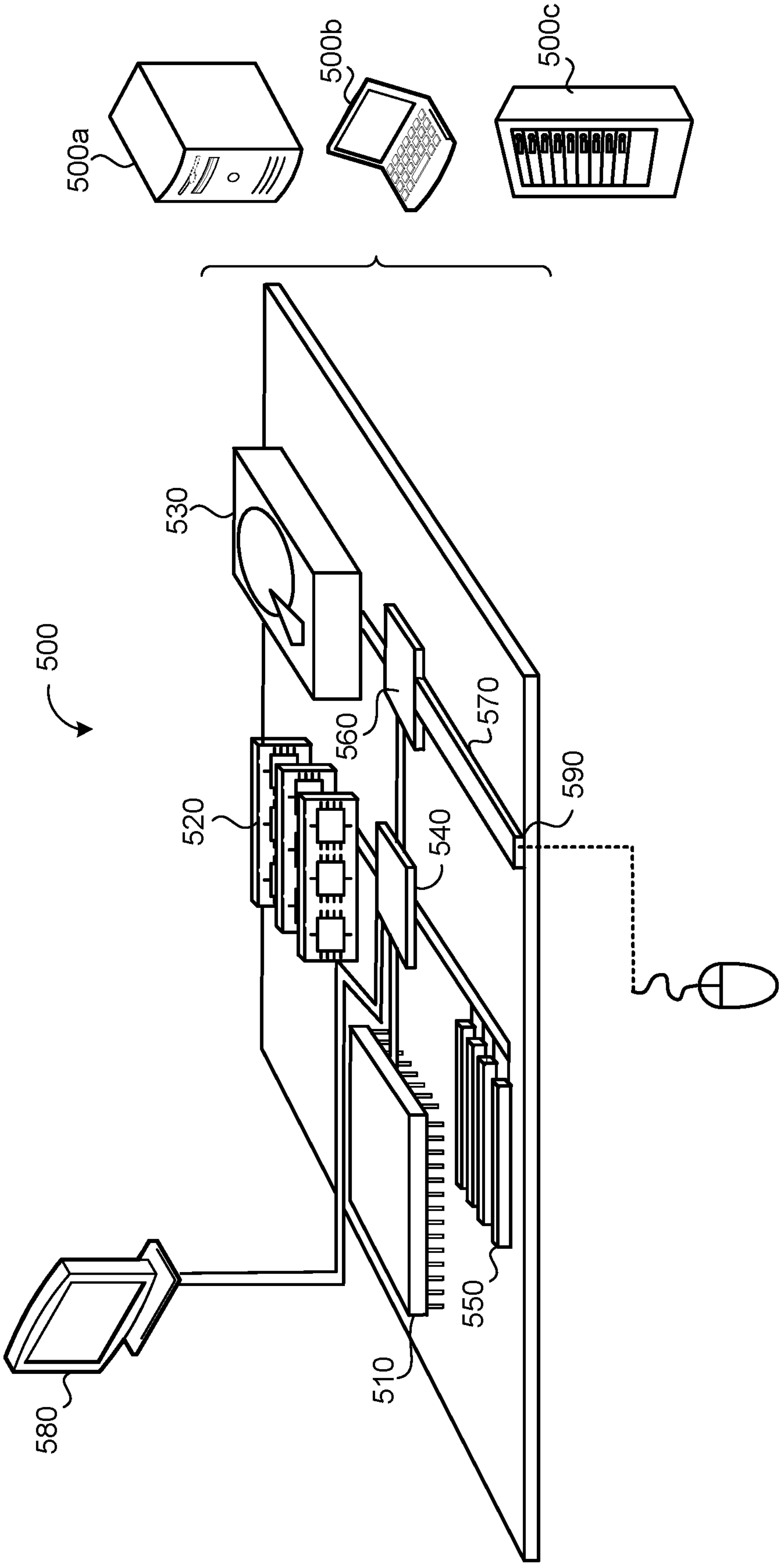
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low-speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high-speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high-speed controller 540 manages bandwidth-intensive operations for the computing device 500, while the low-speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server **500*a* or multiple times in a group of such servers 500*a*, as a laptop computer 500*b*, or as part of a rack server system 500*c***.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
- obtaining a plurality of segments of data and a target bitrate, each respective segment of data representing a corresponding portion of image data;
- determining, based on the plurality of segments of data and the target bitrate, a quantization parameter (QP) value representing an amount of compression achieved while encoding the plurality of segments of data; and
- for each respective segment of data of the plurality of segments of data:
  - determining, based on a scene composition parameter quantifying a composition of the respective segment of data, a corresponding scaling factor;
  - scaling, based on the corresponding scaling factor and a maximum QP value, the QP value;
  - encoding, using the scaled QP value, the respective segment of data; and
  - transmitting the respective encoded segment of data to a remote device.

2. The method of claim 1, wherein the operations further comprise determining the scene composition parameter based on a previously encoded segment of data.

3. The method of claim 1, wherein determining the corresponding scaling factor is further based on an accuracy of an integrated bit rate control algorithm used to encode the respective segment of data.

4. The method of claim 1, wherein scaling the QP value is further based on a minimum QP value.

5. The method of claim 4, wherein the minimum QP value and the maximum QP value establish a range of QP values associated with the scaled QP value.

6. The method of claim 1, wherein the operations further comprise, while encoding the respective segment of data, adjusting the scaled QP value to a QP value different from the scaled QP value.

7. The method of claim 1, wherein the respective segment of data belongs to a same corresponding portion of image data as a previously encoded segment of data.

8. The method of claim 1, wherein the respective segment of data belongs to a different corresponding portion of image data than a previously encoded segment of data.

9. The method of claim 1, wherein the plurality of segments of data comprise a real-time video communication between a user device and the remote device.

10. The method of claim 1, wherein the remote device comprises a cloud computing environment.

11. A system comprising:
- data processing hardware; and
- memory hardware in communication with the data processing hardware, the memory hardware storing instructions that when executed on the data processing hardware cause the data processing hardware to perform operations comprising:
  - obtaining a plurality of segments of data and a target bitrate, each respective segment of data representing a corresponding portion of image data;
  - determining, based on the plurality of segments of data and the target bitrate, a quantization parameter (QP) value representing an amount of compression achieved while encoding the plurality of segments of data; and
  - for each respective segment of data of the plurality of segments of data:
    - determining, based on a scene composition parameter quantifying a composition of the respective segment of data, a corresponding scaling factor;
    - scaling, based on the corresponding scaling factor and a maximum QP value, the QP value;
    - encoding, using the scaled QP value, the respective segment of data; and
    - transmitting the respective encoded segment of data to a remote device.

12. The system of claim 11, wherein the operations further comprise determining the scene composition parameter based on a previously encoded segment of data.

13. The system of claim 11, wherein determining the corresponding scaling factor is further based on an accuracy of an integrated bit rate control algorithm used to encode the respective segment of data.

14. The system of claim 11, wherein scaling the QP value is further based upon a minimum QP value.

15. The system of claim 14, wherein the minimum QP value and the maximum QP value establish a range of QP values associated with the scaled QP value.

16. The system of claim 11, wherein the operations further comprise, while encoding the respective segment of data, adjusting the scaled QP value to a QP value different from the scaled QP value.

17. The system of claim 11, wherein the respective segment of data belongs to a same corresponding portion of image data as a previously encoded segment of data.

18. The system of claim 11, wherein the respective segment of data belongs to a different corresponding portion of image data than a previously encoded segment of data.

19. The system of claim 11, wherein the plurality of segments of data comprise a real-time video communication between a user device and the remote device.

20. The system of claim 11, wherein the remote device comprises a cloud computing environment.

* * * * *